US012577152B2

(12) United States Patent
Park et al.

(10) Patent No.: US 12,577,152 B2
(45) Date of Patent: Mar. 17, 2026

(54) PROCESSING APPARATUS AND PROCESSING METHOD

(71) Applicant: Samsung Display Co., LTD., Yongin-si (KR)

(72) Inventors: Jeongjin Park, Yongin-si (KR); Yong-Hoon Kwon, Yongin-si (KR); Byunghoon Kim, Yongin-si (KR); Taeoh Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 180 days.

(21) Appl. No.: 18/367,559

(22) Filed: Sep. 13, 2023

(65) Prior Publication Data

US 2024/0174559 A1 May 30, 2024

(30) Foreign Application Priority Data

Nov. 24, 2022 (KR) ........................ 10-2022-0159124

(51) Int. Cl.
| | |
|---|---|
| *C03C 21/00* | (2006.01) |
| *B23K 26/146* | (2014.01) |
| *B23K 26/364* | (2014.01) |
| *B23K 26/402* | (2014.01) |
| *B23K 26/70* | (2014.01) |
| *C03B 33/02* | (2006.01) |
| *C03C 23/00* | (2006.01) |
| *B23K 101/36* | (2006.01) |
| *B23K 103/00* | (2006.01) |

(52) U.S. Cl.
CPC .......... *C03C 21/002* (2013.01); *B23K 26/146* (2015.10); *B23K 26/364* (2015.10); *B23K 26/402* (2013.01); *B23K 26/702* (2015.10); *C03B 33/0222* (2013.01); *C03C 23/0025* (2013.01); *C03C 23/0075* (2013.01); *B23K 2101/36* (2018.08); *B23K 2103/54* (2018.08)

(58) Field of Classification Search
CPC B23K 26/146; B23K 2103/54; C03C 21/002; C03C 23/0025
See application file for complete search history.

(56) References Cited

U.S. PATENT DOCUMENTS

| | | | | |
|---|---|---|---|---|
| 6,777,647 B1 * | 8/2004 | Messal | ...................... | A61F 2/91 |
| | | | | 219/121.84 |
| 2010/0213166 A1 * | 8/2010 | Kray | .................... | B23K 26/144 |
| | | | | 118/620 |

FOREIGN PATENT DOCUMENTS

| | | | | | |
|---|---|---|---|---|---|
| CN | 113634921 A | * | 11/2021 | ............. | B23K 26/38 |
| JP | 2008153349 A | * | 7/2008 | ........... | B23K 26/146 |
| JP | 2011056514 A | | 3/2011 | | |
| KR | 101620375 B1 | | 5/2016 | | |
| KR | 102373937 B1 | | 3/2022 | | |
| KR | 1020220046140 A | | 4/2022 | | |

(Continued)

*Primary Examiner* — Atul P. Khare
(74) *Attorney, Agent, or Firm* — CANTOR COLBURN LLP

(57) ABSTRACT

A processing apparatus includes a first processing unit to spray a mixture into a first region of a processing target, and a second processing unit to irradiate a beam into the first region of the processing target, and maintain a temperature of the first region to a predetermined temperature or more, in which the predetermined temperature is for ion-exchange between the processing target and some materials of the mixture.

9 Claims, 16 Drawing Sheets

(56)     References Cited

FOREIGN PATENT DOCUMENTS

| KR | 1020220059674 A | 5/2022 | |
| WO | WO-2015087904 A1 * | 6/2015 | ............. B23K 26/38 |

* cited by examiner

Start

Prepare for processing target and processing apparatus — S100

Pre-process processing target — S200

Cut and post-process processing target — S300

End

S300

Irradiate beam into processing target — S301

Form specific cut surface for processing target — S302

Heal or temper cut surface — S303

Additionally heal or temper cut surface — S304

PROCESSING APPARATUS AND PROCESSING METHOD

This application claims priority to Korean Patent Application No. 10-2022-0159124, filed on Nov. 24, 2022, and all the benefits accruing therefrom under 35 U.S.C. § 119, the content of which in its entirety is herein incorporated by reference.

BACKGROUND

1. Field

Embodiments of the disclosure relate to a processing apparatus and a processing method, and more particularly, relate to a processing apparatus and a processing method, capable of simultaneously cutting and tempering a processing target.

2. Description of the Related Art

A display device is used for various multimedia devices, such as a television, a cellular phone, a tablet computer, or a game machine, to provide image information to a user. Recently, various types of flexible display devices to be foldable or bendable are being developed.

The flexible display device may include a display module and a window which are foldable or bendable. A window included in the display device effectively transmits image information, which is provided from the display module, to the outside, and protects the display module from the outside.

A glass used for the window of the flexible display device is desired to be foldable or bendable, or to have excellent stiffness against an external impact. An ultra-thin glass chemically tempered may have been used for the window. Accordingly, studies and researches are being performed on a process for effectively fabricating the ultra-thin glass chemically tempered.

SUMMARY

Embodiments of the disclosure provide a processing apparatus and a processing method, capable of cutting an ultra-thin glass using a beam and a material.

Embodiments of the disclosure provide a processing apparatus and a processing method, capable of maintaining the temperature of a predetermined region of an ultra-thin glass to the temperature of the ion-exchange between a partial material of a mixture and a processing target.

Embodiments of the disclosure provide a processing apparatus and a processing method, capable of simultaneously cutting and tempering an ultra-thin glass by spraying a mixture into a predetermined region of the ultra-thin glass.

In an embodiment of the disclosure, a processing apparatus includes a first processing unit to spray a mixture into a first region of a processing target, and a second processing unit to irradiate a beam into the first region of the processing target, and maintain a temperature of the first region to a predetermined temperature or more, in which the predetermined temperature is a temperature for ion-exchange between the processing target and some materials of the mixture.

In an embodiment, the mixture may include a first material and a second material which are mutually different from each other, the first region may include a cut surface exposed by the first material, and the cut surface may be healed and tempered by the second material.

In an embodiment, the path of the beam is defined inside the mixture sprayed.

In an embodiment, the beam is totally reflected inside the mixture sprayed.

In an embodiment, the processing target is a glass having a thickness in a range of about 10 micrometers ($\mu$m) to about 100 $\mu$m.

In an embodiment, the first material may include an acid including F, S, or N, the second material may include at least one of potassium hydroxide, sodium hydroxide, or gallium nitrate, and the beam may be an ultraviolet ("UV") laser or a carbon dioxide ($CO_2$) laser.

In an embodiment, the first processing unit may include a tank to store the mixture, a nozzle to spray the stored mixture, and a tube to connect the tank and the nozzle.

In an embodiment, the second processing unit may include a light source to irradiate the beam to the processing target, and a lens to adjust the focus of the beam.

In an embodiment, the processing apparatus may further include an additional processing unit to spray the mixture into the first region of the processing target.

In an embodiment, the processing apparatus may further include a heating unit to adjust a temperature of the mixture to be in the predetermined range. The temperature of the mixture may be adjusted between a temperature for etching the processing target and a lower-limit of a phase-shift temperature of the mixture.

In an embodiment, a processing method includes preparing for a processing target and a processing apparatus, pre-processing the processing target, and cutting and post-processing the processing target. The cutting and the post-processing of the processing target includes irradiating a beam into a first region of the processing target, providing a first material to the first region to form a predetermined cut surface in the first region, and providing a second material different from the first material to the first region to heal and temper the cut surface. The first material and the second material are simultaneously provided.

In an embodiment, the beam may maintain a temperature of the first region to a predetermined temperature or more, and the predetermined temperature may be a temperature for ion-exchange between the processing target and the second material.

In an embodiment, the cutting and the post-processing of the processing target may further include tempering the cut surface through an additional processing apparatus.

In an embodiment, the processing apparatus may spray the first material and the second material in a direction normal to the processing target, and the additional processing apparatus may spray the second material in a direction tilted to a normal direction of the processing target at a predetermined angle.

In an embodiment, the additional processing apparatus may spray the second material to a region wider than the first region.

In an embodiment, the first material may include an acid including F, S, or N, the second material may include at least one of potassium hydroxide, sodium hydroxide, or gallium nitrate, and the beam may be a UV laser or a carbon dioxide ($CO_2$) laser.

In an embodiment, the processing apparatus may include a first processing unit to spray a mixture including the first material and the second material into a first region, and a second processing unit to irradiate a beam into the first region. The beam may have a path defined inside a sprayed mixture, and the beam may be totally reflected inside the sprayed mixture.

In an embodiment, the beam may be an UV laser or a carbon dioxide ($CO_2$) laser.

In an embodiment, the processing method may further include cleaning the processing target.

In an embodiment, the processing target is a glass having a thickness in a range of about 10 µm to about 100 µm.

BRIEF DESCRIPTION OF THE DRAWINGS

The above and other embodiments, advantages and features of the disclosure will become apparent by describing in detail embodiments thereof with reference to the accompanying drawings.

FIG. TA is a perspective view illustrating an embodiment of a display device unfolded.

DETAILED DESCRIPTION

Figure 1A:
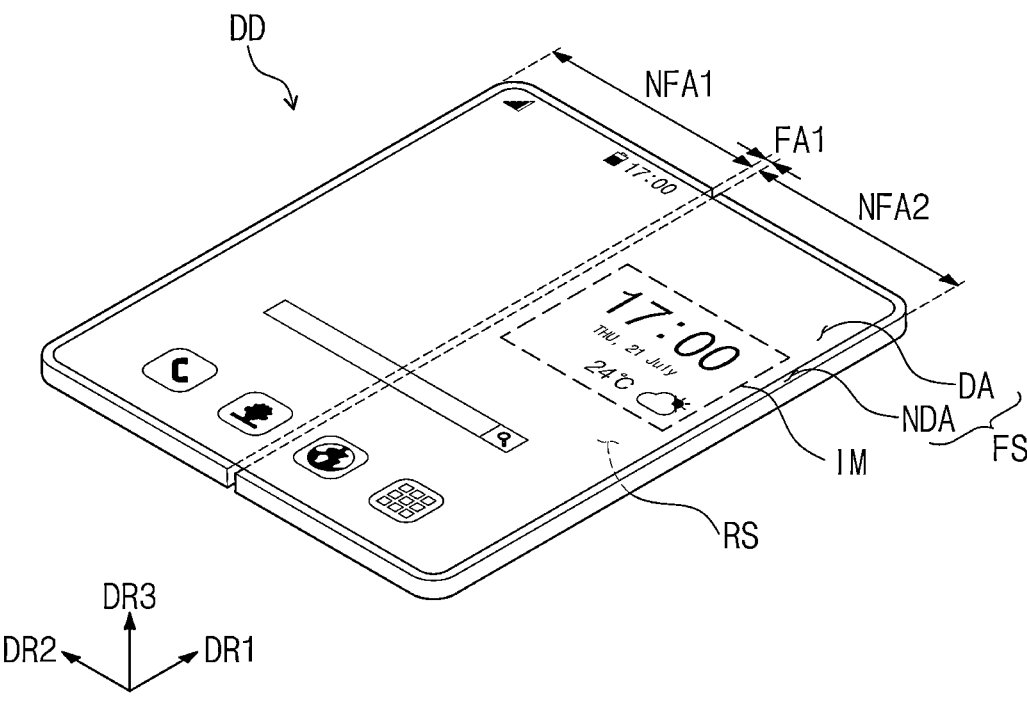
FIG. 1B is a perspective view illustrating an embodiment of a display device in an in-folding state according to the disclosure.
FIG. 1C is a perspective view illustrating an embodiment of a display device in an out-folding state according to the disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

Figure 1B:
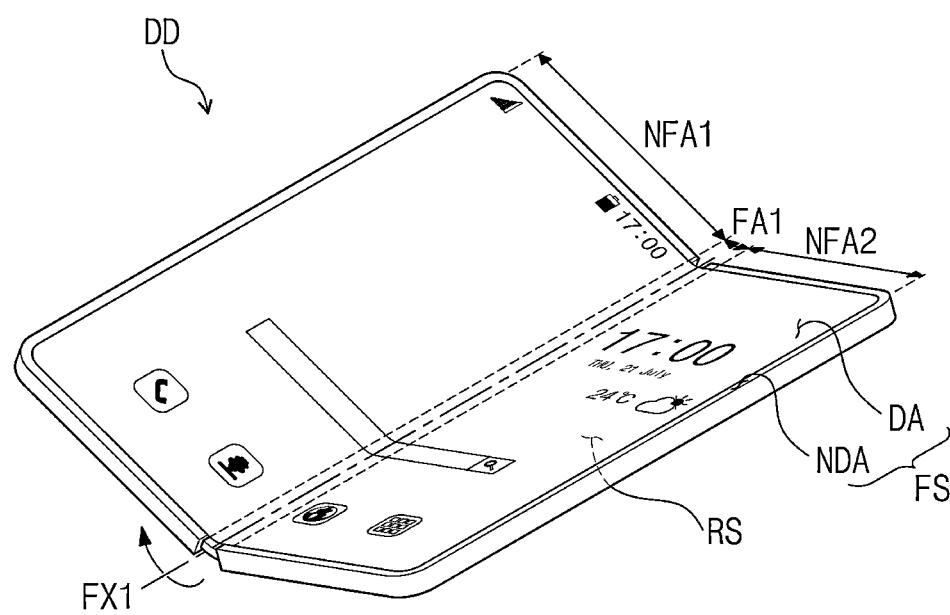
Figure 1B:
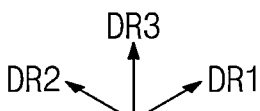
Figure 1C:
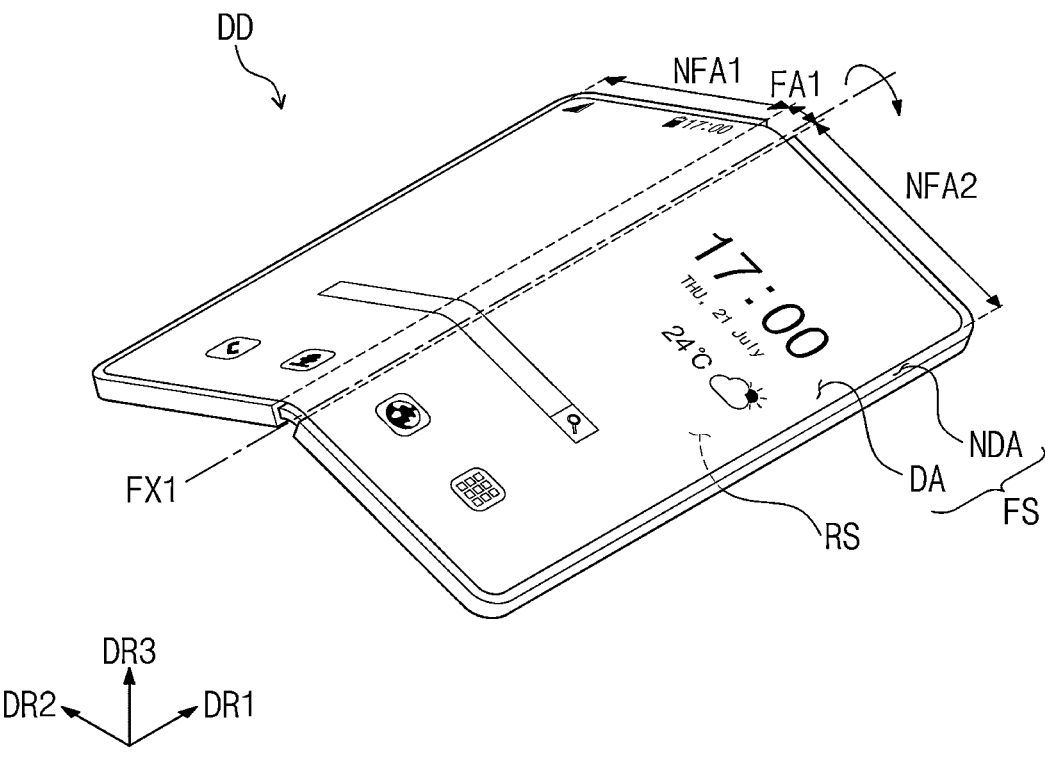

FIG. 1A is a perspective view illustrating an embodiment of a display device unfolded according to the disclosure, FIG. 1B is a perspective view illustrating an embodiment of a display device in an in-folding state according to the disclosure, and FIG. 1C is a perspective view illustrating an embodiment of a display device in an out-folding state according to the disclosure.

In an embodiment, a display device DD may be a device activated in an electrical signal. In an embodiment, the display device DD may be a cellular phone, a tablet, a vehicle navigation system, a game console, or a wearable device, for example, but the disclosure is not limited thereto. In the specification, FIG. 1A illustrates that the display device DD is a cellular phone, by way of example.

FIG. 1A and drawings thereafter illustrate first to third directions DR1 to DR3, and directions indicated by the first to third directions DR1 to DR3 described in this specification may be relative concept and may be converted into other directions.

Referring to FIGS. 1A to 1C, the display device DD in an embodiment may include a first display surface FS defined by the first direction DR1 and the second direction DR2 crossing the first direction DR1. The display device DD may provide an image IM to the user through the first display surface FS. The display device DD in an embodiment may display the image IM on the first display surface FS, which is parallel to each of the first direction DR1 and the second direction DR2, such that the image IM faces a third direction DR3. In the specification, a front surface (or an upper surface) and a rear surface (or a lower surface) of each component are defined based on a direction in which the image IM is displayed. The front surface and the rear surface are opposite to each other in the third direction DR3, and a normal direction to the front surface and the rear surface may parallel to the third direction DR3.

The display device DD in an embodiment may include the first display surface FS and a second display surface RS. The first display surface FS may include a display region DA and a non-display region NDA. An electronic module region (not illustrated) may be included in the display region DA. The second display surface RS may be defined as a surface opposite to at least a portion of the first display surface FS. In other words, the second display surface RS may be defined as a portion of the rear surface of the display device DD.

In an embodiment, the display device DD may sense an external input applied from the outside. The external input may include various types of inputs provided from the outside of the display device DD. In an embodiment, as well as a contact by a part of a body such as a hand of the user, the external input may include an external input (e.g., hovering) applied when the user's hand comes close to the display device DD or is adjacent to the display device DD within a given distance, for example. In addition, the external input may be provided in various types such as force, pressure, temperature, or light.

The display device DD may include a folding region FA1 and non-folding regions NFA1 and NFA2. The display device DD in an embodiment may include the first non-folding region NFA1 and the second non-folding region NFA2 which are disposed while interposing the folding region FA1 between the first non-folding region NFA1 and the second non-folding region NFA2. Although FIGS. 1A to 1C illustrate the display device DD including one folding region FA1 in an embodiment, the disclosure is not limited thereto. In an embodiment, a plurality of folding regions may be defined in the display device DD, for example.

Referring to FIG. 1B, the display device DD in an embodiment may be folded about a first folding axis FX1. The first folding axis FX1 is a virtual axis extending in the first direction DR1, and the first folding axis FX1 may be parallel to the direction of a longer side of the display device DD. The first folding axis FX1 may extend in the first direction DR1 on the first display surface FS.

In an embodiment, the non-folding regions NFA1 and NFA2 may be adjacent to the folding region FA1 while interposing the folding region FA1 between the non-folding regions NFA1 and NFA2. In an embodiment, the first non-folding region NFA1 may be disposed at one side of the folding region FA1 in the second direction DR2, and the second non-folding region NFA2 may be disposed at an opposite side of the folding region FA1 in the second direction DR2, for example.

The display device DD may be folded about the first folding axis FX1 and may be changed to be in an in-folding state in which one region of the first display surface FS, which is overlapped with the first non-folding region NFA1, and another region, which is overlapped with the second non-folding region NFA2, face each other. According to the display device DD of an embodiment, the second display surface RS may be viewed by the user, in the in-folding state. The second display surface RS may further include an electronic module region for an electronic module including various components, and the disclosure is not limited to any particular embodiment.

Referring to FIG. 1C, the display device DD in an embodiment may be folded about the first folding axis FX1 and may be changed to be in an out-folding state in which one region of the second display surface RS, which is overlapped with the first non-folding region NFA1, and another region of the second display surface RS, which is overlapped with the second non-folding region NFA2, face each other. However, the disclosure is not limited thereto. In an embodiment, the display device DD is folded about a plurality of folding axes, such that portions of the first display surface FS face each other, portions of the second display surface RS face each other, for example, and the number of the folding axes and the number of the non-folding regions based on the number of the folding axes are not specifically limited thereto.

The display device DD may further include various electronic modules. In an embodiment, the electronic module may include at least one of a camera, a speaker, a light sensing sensor, or a heat sensing sensor, for example. The electronic module may sense an external subject received through the first or second display surfaces FS and RS or may provide a sound signal, such as a voice, to the outside through the first or second display surfaces FS and RS. The electronic module may include a plurality of components, and the disclosure is not limited to any particular embodiment.

Figure 2A:
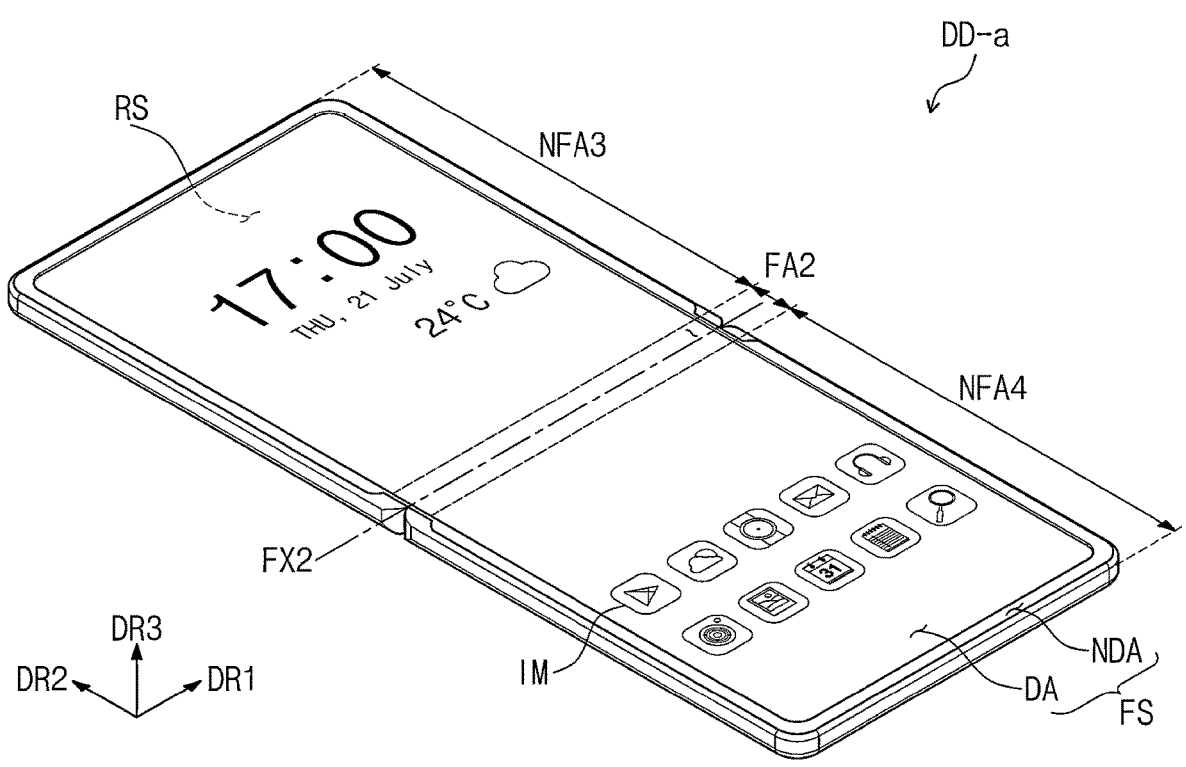
FIG. 2A is a perspective view illustrating an embodiment of a display device unfolded according to the disclosure.
Figure 2B:
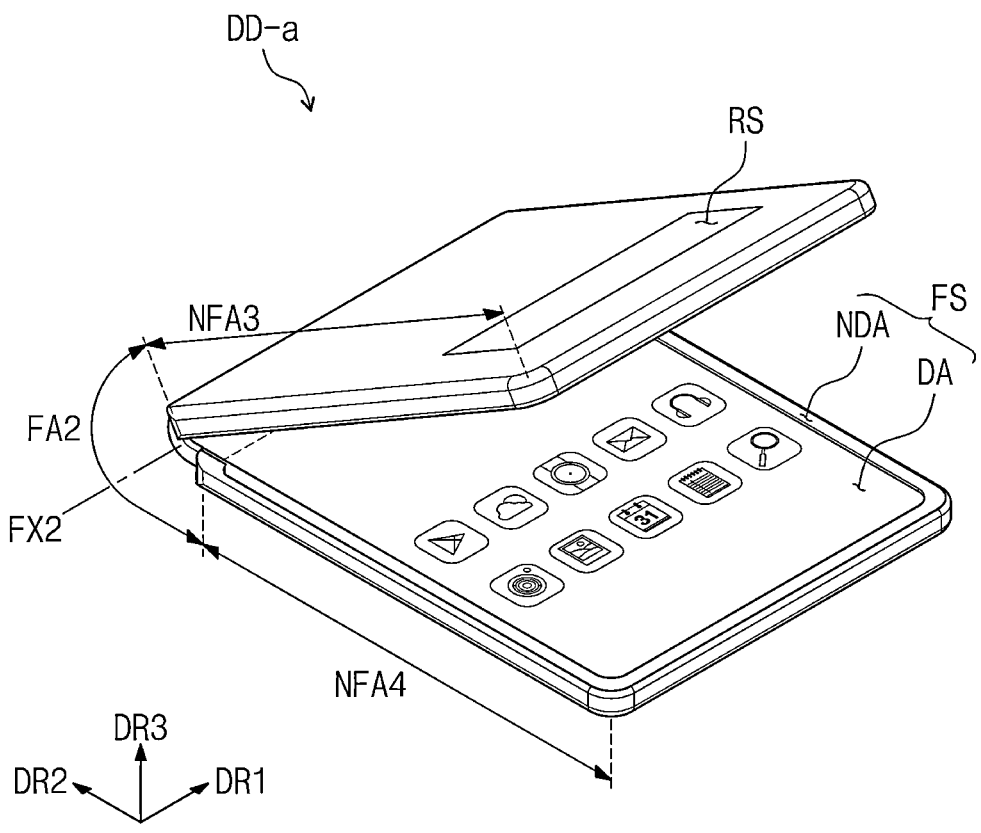
FIG. 2B is a perspective view illustrating an embodiment of a display device in an in-folding state according to the disclosure.

FIG. 2A is a perspective view illustrating an embodiment of a display device unfolded according to the disclosure, and FIG. 2B is a perspective view illustrating an embodiment of a display device in an in-folding state according to the disclosure.

In an embodiment, a display device DD-a may be folded about a second folding axis FX2 extending in one direction parallel to the first direction DR1. FIG. 2B illustrates that the extending direction of the second folding axis FX2 is parallel to an extending direction of a shorter side of the display device DD-a. However, the disclosure is not limited thereto.

In an embodiment, the display device DD-a may include at least one folding region FA2 and non-folding regions NFA3 and NFA4 adjacent to the folding region FA2. The non-folding regions NFA3 and NFA4 may be spaced apart from each other while interposing the folding region FA2 between the non-folding regions NFA3 and NFA4.

In an embodiment, the third non-folding region NFA3 and the fourth non-folding region NFA4 may face each other, and the display device DD-a may be in the in-folding state to prevent the display surface FS from being exposed to the outside. In addition, although not illustrated, in an embodiment the display device DD-a may be in the out-folding state such that the display surface FS is exposed to the outside. In addition, in an embodiment, the display device DD-a may include the first display surface FS and the second display surface RS, and the first display surface FS may include the display region DA and the non-display region NDA. The display device DD-a may further include various electronic modules.

Referring to FIGS. 1A to 1C, and FIGS. 2A and 2B, according to the disclosure, the display device DD or DD-a may repeat the switch from the unfolding operation to an in-folding or out-folding operation and the switch from the in-folding or out-folding operation to the unfolding operation, but the disclosure is not limited thereto. In an embodiment, the display device DD or DD-a may select any one of the unfolding operation, the in-folding operation, and the out-folding operation. In addition, although not illustrated, in an embodiment, the display device may be a flexible display device including a plurality of folding regions, or having at least a partial region to be bendable or rollable.

Figure 3:
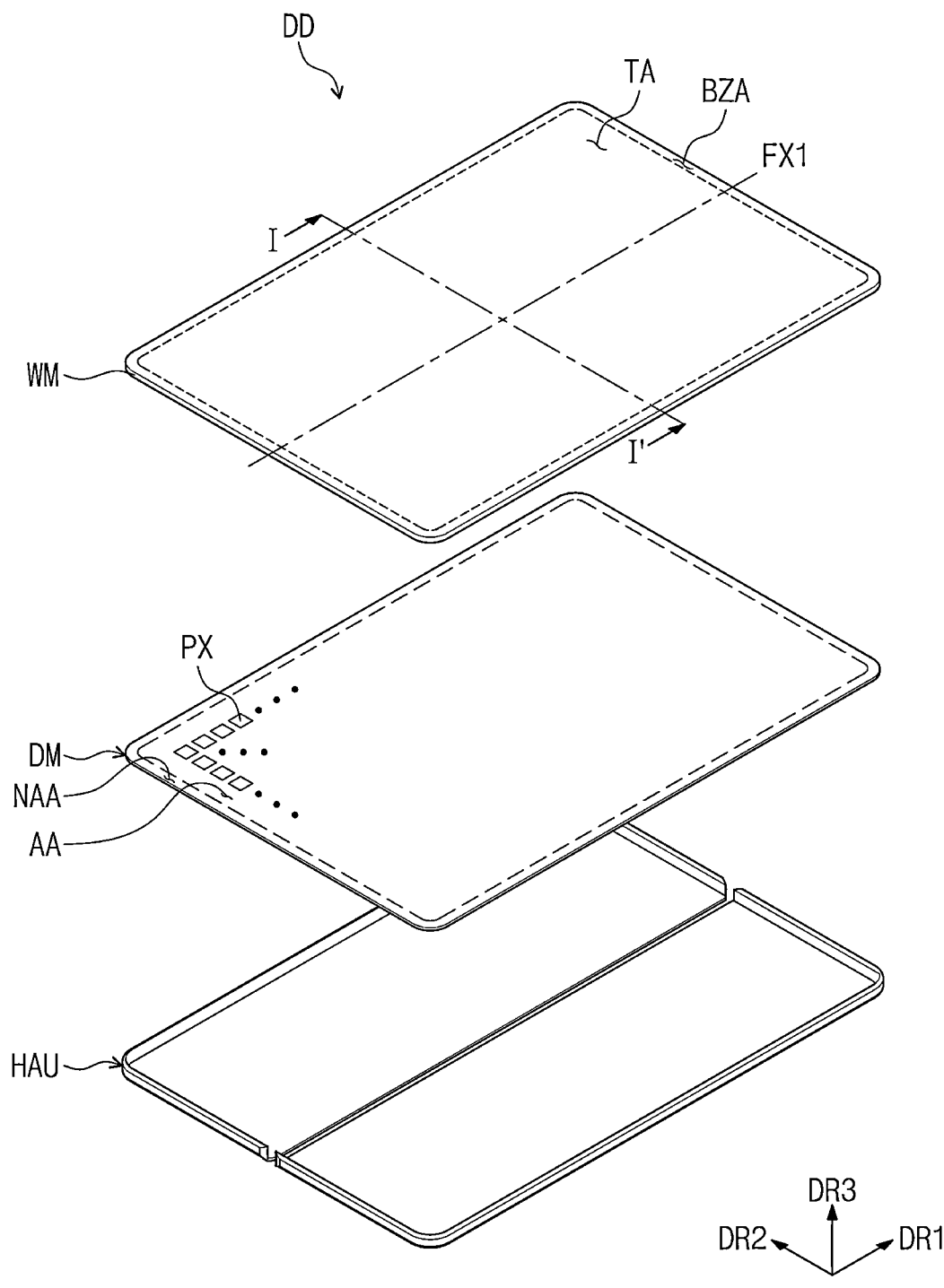
FIG. 3 is an exploded perspective view of an embodiment of a display device according to the disclosure.

FIG. 3 is an exploded perspective view of an embodiment of a display device according to the disclosure.

FIG. 3 illustrates an exploded perspective view of the display device DD illustrated in FIG. 1A. Referring to FIG. 3, in an embodiment, the display device DD may include a display module DM and a window WM disposed on the display module DM. The window WM may be disposed on at least one of an upper portion or a lower portion of the display module DM. FIG. 3 illustrates that the window WM is disposed on the display module DM.

In addition, in an embodiment, the display device DD may further include an electronic module (not illustrated) disposed under the display module DM. In an embodiment, the electronic module (not illustrated) may include a camera module, for example.

In addition, although not illustrated, in an embodiment, the display device DD may further include an adhesive layer and/or a polarizing film interposed between the display module DM and the window WM. In addition, although not illustrated, in an embodiment, the display device DD may further include a lower functional layer disposed under the display module DM.

In an embodiment, the display device DD may further include a housing HAU to receive the display module DM and the lower functional layer. The housing HAU may be coupled to the window WM to form an outer appearance of the display device DD. The housing HAU may include a material having higher stiffness. In an embodiment, the housing HAU may include a plurality of frames and/or plates including glass, plastic, or metal, for example. The display module DM may be received in a receiving space to be protected from an external impact. Although not illustrated, the housing HAU may further include a hinge structure for facilitating folding or bending.

In an embodiment, the display module DM may display the image IM, and may transmit/receive information on an external input, in response to an electrical signal. The display module DM may include a display panel and a sensor layer disposed on the display panel.

The display module DM may include an active region AA and a peripheral region NAA. The active region AA may be a region for providing the image IM (refer to FIG. 1A). The active region AA may have a pixel PX disposed therein. The peripheral region NAA may be adjacent to the active region AA. The peripheral region NAA may surround the active region AA. A driving circuit or driving line to drive the active region AA may be disposed in the peripheral region NAA.

The display module DM may include a plurality of pixels PX. Each of the pixels PX may emit light in response to an electrical signal. The light emitted from the pixels PX may implement the image IM. Each of the pixels PX may include a display device. In an embodiment, the display device may include an organic light-emitting device, an inorganic light-emitting device, an organic-inorganic light-emitting device, a micro-light emitting diode ("LED"), a quantum dot light-emitting device, an electrophoretic device, or an electrowetting device, for example.

The window WM may cover the whole upper surface of the display module DM. The window WM may have a shape corresponding to the shape of the display module DM. The window WM may have flexibility to be changed in form, as the display device DD is folded or bent. The window WM may have a function to protect the display module DM from an external impact.

The window WM may include a transmission region TA and a bezel region BZA. The transmission region TA may be overlapped with at least a portion of the active region AA of the display module DM. The transmission region TA may be an optically transparent area. In an embodiment, the transmission region TA may have a transmittance of about 90% with respect to the wavelength of a visible region, for example. The image IM (refer to FIG. TA) may be provided to a user through the transmission region TA, and a user may receive information through the image IM (refer to FIG. TA)

The bezel region BZA may have a light transmittance lower than a light transmittance of the transmission region TA. The bezel region BZA defines a shape of the transmission region TA. The bezel region BZA may have predetermined color. The bezel region BZA may cover the peripheral region NAA of the display module DM to prevent the peripheral region NAA from being visible from the outside. However, the disclosure is not limited thereto. In an embodiment, the window WM in an embodiment of the disclosure may not include the bezel region BZA, for example.

Figure 4:
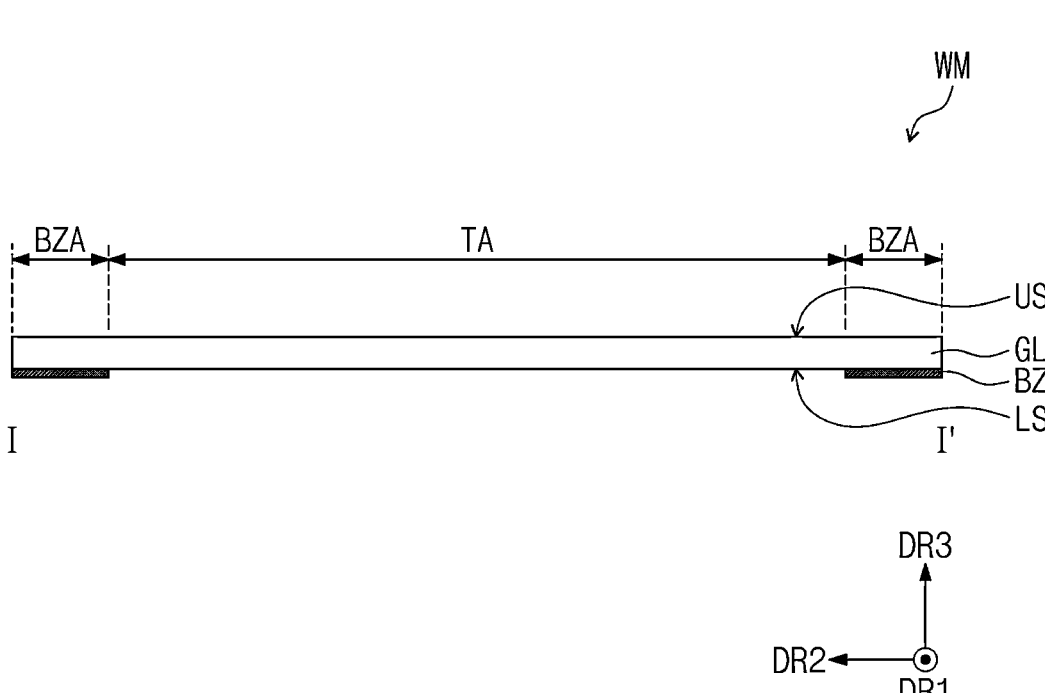
FIG. 4 is a cross-sectional view of an embodiment of a window according to the disclosure.

FIG. 4 is a cross-sectional view of an embodiment of a window according to the disclosure.

FIG. 4 is a cross-sectional view taken along line I-I' of the window WM of the display device DD according to the disclosure. Referring to FIG. 4, in an embodiment, the window WM may include a glass GL.

The glass GL of FIG. 4 may be a processing target completely processed as described below. In addition, the glass GL may be an ultra-thin glass ("UTG") completely processed. As described above, the glass GL provided in the form of the UTG is foldable or bendable and may have excellent stiffness against an external impact.

In an embodiment, the glass GL may include an upper surface US and a lower surface LS. The upper surface US and the lower surface LS of the glass GL are opposite to each other in the third direction DR3, and the direction normal to each of the upper surface US and the lower surface LS may be parallel to the third direction DR3. The upper surface US of the glass GL may be exposed to the outside the display device DD.

The window WM may further include a printing layer BZ disposed on the lower surface LS of the glass GL. The printing layer BZ may be formed through a printing process or a deposition process for the lower surface LS of the glass GL, and the printing layer BZ may be directly disposed on the lower surface LS of the glass GL.

The printing layer BZ may be at least partially disposed on the lower surface LS of the glass GL to define the bezel region BZA. The printing layer BZ may be a portion, which corresponds to the peripheral region NAA (refer to FIG. 3), of the display module DM (refer to FIG. 3).

The printing layer BZ may have a light transmittance lower than a light transmittance of the glass GL. In an embodiment, the printing layer BZ may have a predetermined color, for example. Accordingly, the printing layer BZ may selectively transmit or reflect only light of a predetermined color. In an alternative embodiment, the printing layer BZ may be a light-blocking layer that absorbs incident light. The light transmittance and color of the printing layer BZ may be provided variously depending on the type of the display device DD and the shape of the display device DD.

The glass GL may be the UTG having the thickness of about 100 micrometers (μm) or less. In an embodiment, the thickness of the glass GL may be in the range of about 10 μm to about 100 μm, for example. The glass GL may have an ultra-thin thickness for the use of the flexible display device foldable or bendable. In the illustrated embodiment, the glass GL may have the thickness of about 30 μm, for example.

Figure 5:
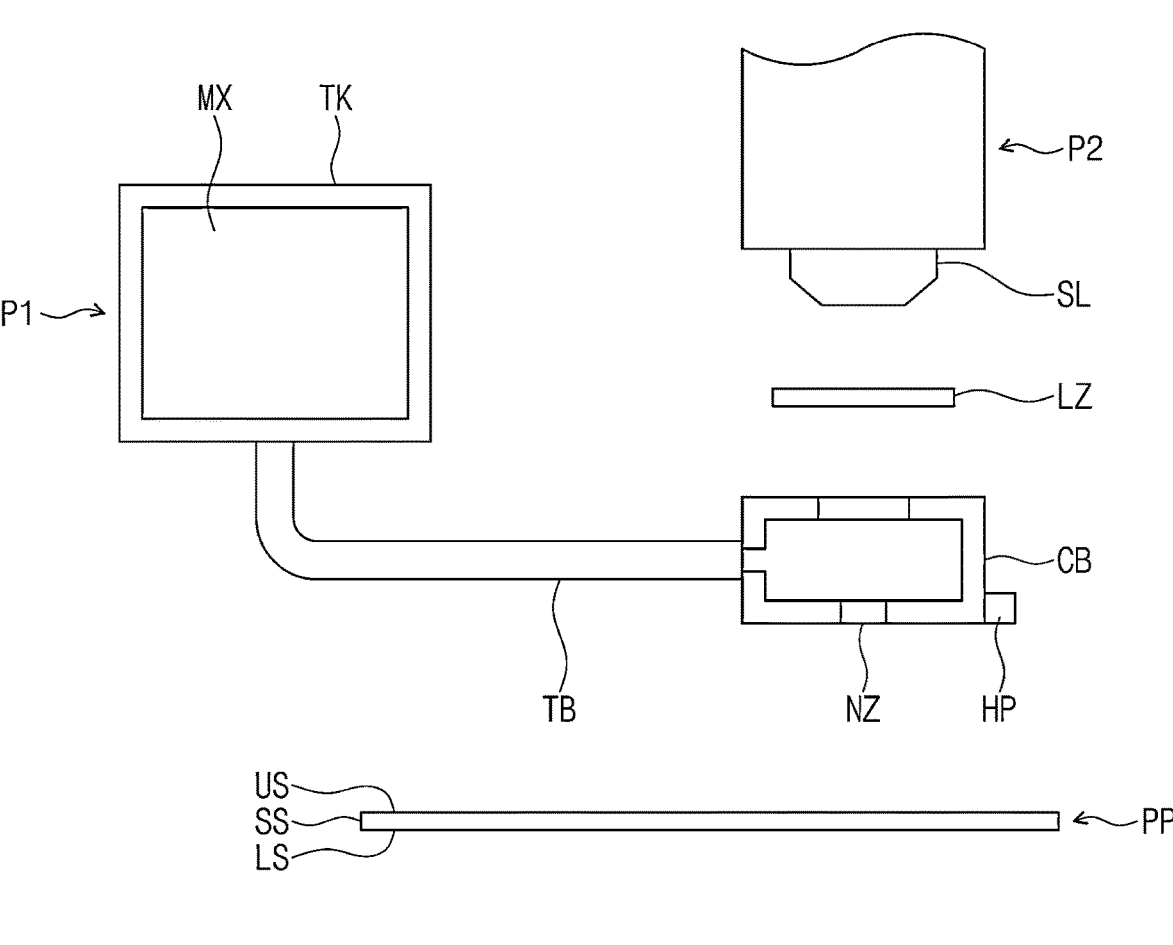
FIG. 5 is a cross-sectional view illustrating an embodiment of a processing apparatus according to the disclosure.
Figure 6A:
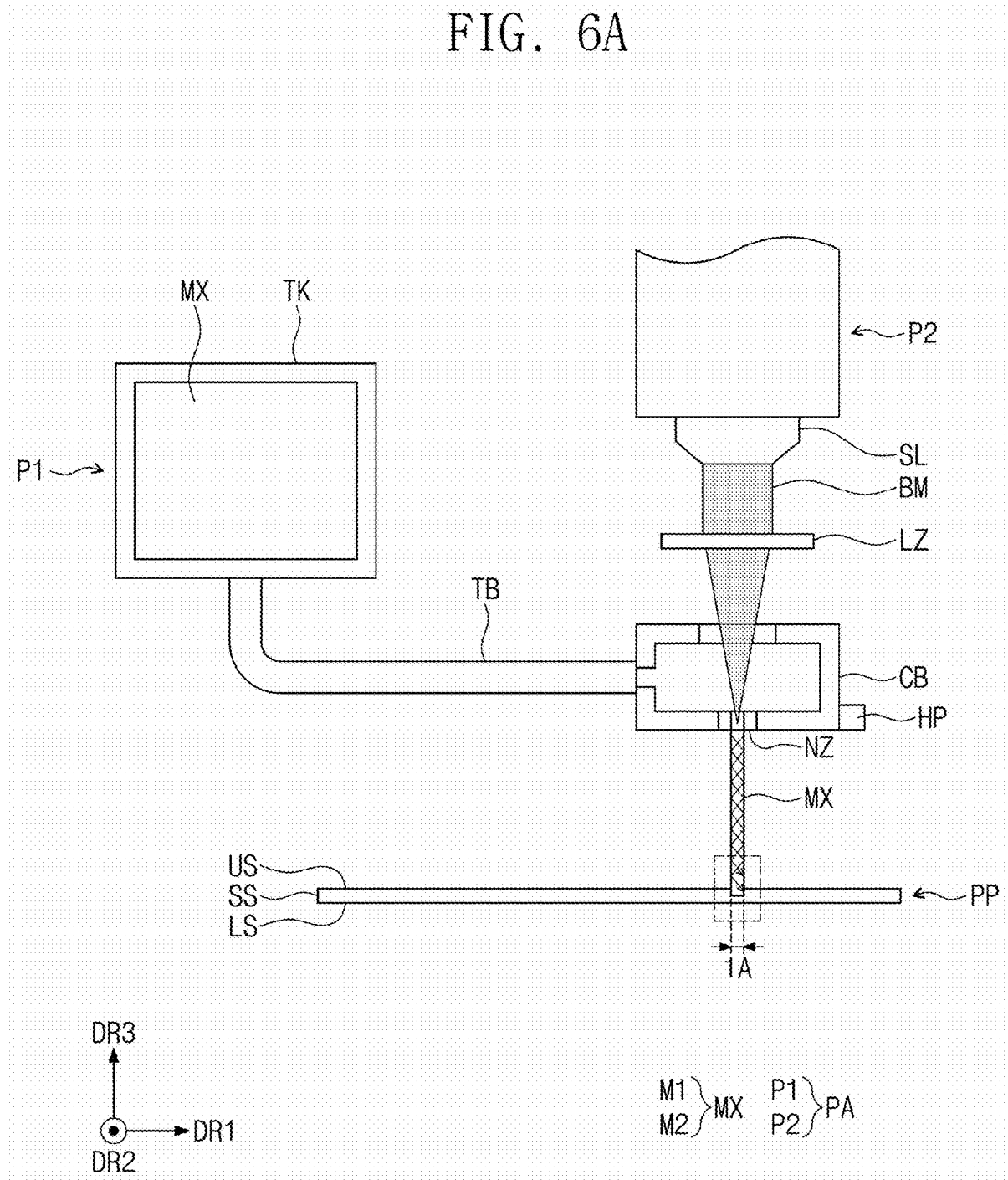
FIG. 6A is a cross-sectional view illustrating an embodiment of an operating state of the processing apparatus according to the disclosure.
Figure 6B:
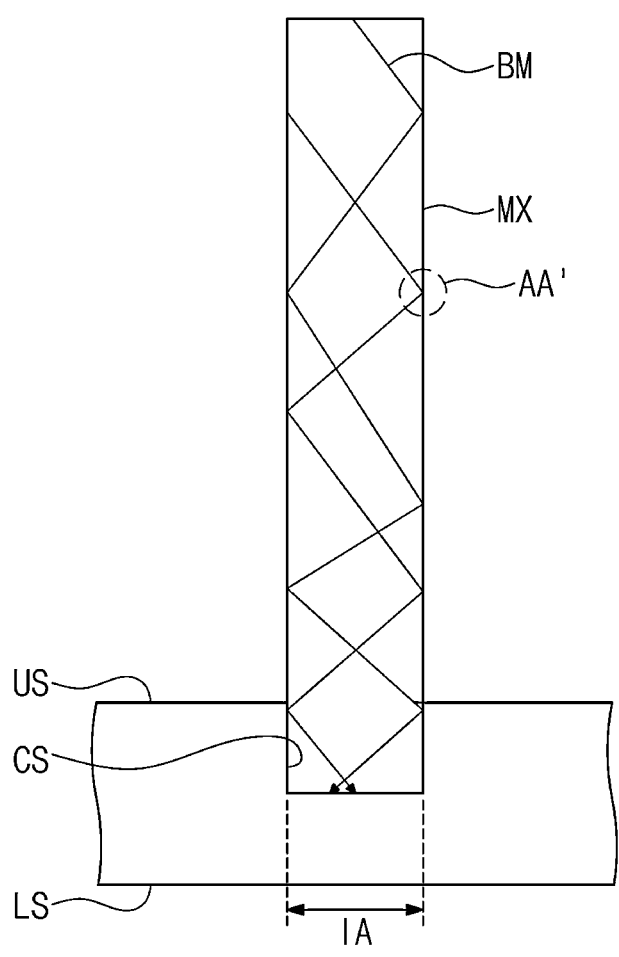
FIG. 6B is an enlarged view illustrating a portion of FIG. 6A.
Figure 6B:

FIG. 5 is a cross-sectional view illustrating an embodiment of a processing apparatus according to the disclosure. FIG. 6A is a cross-sectional view illustrating an embodiment of an operating state of the processing apparatus according to the disclosure. FIG. 6B is an enlarged view illustrating a portion of FIG. 6A.

Referring to FIGS. 5, 6A, and 6B, according to the disclosure, a processing apparatus PA may include a first processing unit P1 and a second processing unit P2.

A processing target PP may include the upper surface US, the lower surface LS opposite to the upper surface US, and a side surface SS to connect the upper surface US to the lower surface LS. The processing target PP may include a first region 1A. The upper surface US and the lower surface LS are overlapped with the first region 1A, and the first region 1A may correspond a region cut by the processing apparatus PA In the first region 1A, a cut surface CS may be exposed by a partial material of a mixture MX. In other words, the cut surface CS of the processing target PP may be exposed, as the first region 1A is cut and processed by a first material M1 to be described later. In addition, in the first region 1A, the cut surface CS may be exposed through a beam BM. In this case, when the beam BM and the first material M1 are simultaneously used, the cut surface CS may be more easily exposed.

The first processing unit P1 may spray the mixture MX in the first region 1A of the processing target PP. The first processing unit P1 may spray the mixture MX in the first region 1A at a higher pressure. The first processing unit P1 may spray the mixture MX in the first region 1A at the higher pressure, such that the cut surface CS is exposed in the first region 1A.

In detail, the first processing unit P1 may include a tank TK to store the mixture MX, a nozzle NZ to spray the stored mixture MX, and a tube (or a pipe) TB to connect the tank TK to the nozzle NZ. The nozzle NZ may be provided in a chamber CB to be described later, and the position of the nozzle NZ may be limited thereto.

The mixture MX moving through the tube TB may be sprayed to the first region 1A of the processing target PP from the nozzle NZ. In this case, the mixture MX may be sprayed onto the processing target PP together with the beam BM to be described later. In this case, the mixture MX and the beam BM may be simultaneously applied onto the processing target PP.

The detailed configuration, the position, or the shape of the first processing unit P1 may correspond to one embodiment of the first processing unit P1, and the detailed configuration, the position, or the shape of the first processing unit P1 may be variously provided without the limitation to the components illustrated in the drawing The mixture MX may include the first material M1 and a second material M2. The first material M1 and the second material M2 may be different from each other. The first material M1 and the second material M2 may be simultaneously sprayed to the processing target PP.

The mixture MX may include a surfactant, water, or an additive, together with the first material M1 and the second material M2. In an embodiment, when desired, the mixture MX may include deionized water ("DI-water") to maintain the potential of hydrogen ("pH") of the mixture MX to a predetermined pH, for example.

In an embodiment, the first material M1 may be a material for etching the processing target PP, and the second material M2 may be a material for healing or tempering the processing target PP, for example.

The processing target PP may be chemically polished by way of embodiment of healing. The embodiment of healing may include an ion-exchange manner between the processing target PP and the healing material. This may be performed in a manner similar to the ion-exchange manner for chemical tempering treatment to be described later. However, the healing is not limited to the ion-exchange manner, and may be provided through various physical and chemical polishing reaction manners.

In an embodiment, the tempering may refer to ion-exchanging between an element of the processing target PP and an element of a tempering material, and the physical property of the processing target PP may be changed through the ion-exchanging, for example. In this case, the tempering may include various physical and chemical tempering reactions.

In an embodiment of the disclosure, the first material M1 may include any one of F, S, or N. The second material M2 may include at least one of potassium hydroxide, sodium hydroxide, or gallium nitrate. However, any one of the first material M1 and the second material M2 are not limited to any particular embodiment. The first material M1 may be an acidic material, and the second material M2 may be an alkaline material.

The second processing unit P2 may irradiate the beam BM to the first region TA of the processing target PP. The second processing unit P2 may expose the cut surface CS by irradiating the beam BM into the first region TA.

Specifically, the second processing unit P2 may include a light source SL that irradiates the beam BM to the processing target PP and a lens LZ that adjusts the focus of the beam BM. The focus of the beam BM emitted from the light source SL may be adjusted through the lens LZ such that the beam BM is irradiated to the processing target PP.

In an embodiment, the beam BM may be irradiated to the processing target PP together with the mixture MX through the chamber CB and the nozzle NZ of the chamber CB. The detailed configuration, the position, or the shape of the second processing unit P2 may correspond to one embodiment of the second processing unit P2, and the detailed configuration, the position, for example, or the shape of the second processing unit P2 may be variously provided without the limitation to the components illustrated in the drawing.

The processing apparatus PA in an embodiment of the disclosure may include a heating unit HP. The heating unit HP may adjust the temperature of the mixture MX within a predetermined temperature range. In this case, the predetermined temperature range is a range between the etching temperature of the processing target PP and the lowest temperature of the phase-shift temperatures of the mixture MX.

The heating unit HP may adjust the temperature of the mixture MX, such that the temperature of the mixture MX is maintained between the etching temperature of the processing target PP and a phase-shift temperature of a material showing the lowest phase-shift temperature of materials constituting the mixture MX. In an embodiment, when the processing target PP includes glass, and the mixture MX includes sodium hydroxide, the temperature of the mixture MX adjusted by the heating unit HP may be in the range from about 500 degrees Celsius (° C.) or more to about 1388° C. or less, for example.

In addition, the temperature of the processing target PP may be prevented from being lowered due to the contact between the processing target PP and the mixture MX, by increasing the temperature of the mixture MX.

Although illustrated in the drawing, the heating unit HP may be disposed outside the chamber CB. However, the heating unit HP may be disposed inside the chamber CB without the limitation to the drawing. In an embodiment, the heating unit HP may be variously disposed inside or outside the tank TK without any one limitation, for example.

The chamber CB may be disposed on the path of the mixture MX and the beam BM. Specifically, the mixture MX and the beam BM may reach the processing target PP through the chamber CB.

The beam BM irradiated from the light source SL to the processing target PP may be a laser. According to the disclosure, the light source SL may employ a laser beam BM having a wavelength selected from a broad wavelength band ranging from a wavelength of a deep ultraviolet ("deep-UV") laser to a wavelength of a carbon dioxide ($CO_2$) laser. In an embodiment, the beam may be emitted from a UV laser or carbon dioxide ($CO_2$) laser.

The chamber CB may be disposed on a path of the mixture MX and the beam BM. Specifically, the mixture MX and the beam BM may reach the processing target PP through the chamber CB. In the illustrated embodiment, the path of the mixture MX may be parallel to the thickness direction of the processing target PP, that is, the direction normal to the upper surface of the processing target PP.

An auxiliary lens is provided in the chamber CB to adjust the focus of the beam BM, together with the lens LZ of the second processing unit P2. The auxiliary lens may adjust the focus of the beam BM such that the path of the beam BM is disposed inside the mixture MX.

An irradiation region of the beam BM onto the processing target PP and a spray region of the mixture MX may be the same as the first region TA. In an embodiment, the path of the beam BM may be disposed inside the mixture MX, for example. In detail, the actual irradiation direction of the beam BM into the processing target PP may be parallel to the spraying direction of the mixture MX. The actual irradiation direction of the beam BM may be defined as a straight direction to the first region TA of the processing target PP, at which the beam BM arrives, from the nozzle NZ emitting the beam BM.

Referring to FIG. 6B, the beam BM may be totally reflected in the sprayed mixture MX. The beam BM may be totally reflected in the sprayed mixture MX, at a region AA' partially in contact to the beam BM irradiated into the first region TA and the mixture MX sprayed into the first region TA. In detail, the beam BM may be totally reflected in the mixture MX, due to the difference in refractive index between the mixture MX and external gas (e.g., air) of the mixture MX. As the beam BM is totally reflected in the mixture MX, the irradiation path of the beam BM may be substantially matched with the path of the mixture MX. Accordingly, the beam BM is prevented from being emitted out of the mixture MX, such that the processing target PP is effectively processed.

The second processing unit P2 may maintain the temperature of the first region TA at a predetermined temperature or higher through the beam BM. The predetermined temperature may be an ion exchange temperature between the processing target PP and some materials of the mixture MX. The predetermined temperature may be an ion exchange temperature between the processing target PP and the second material M2 of the mixture MX. As the temperature of the first region TA is maintained to the ion exchange temperature or more, the time for tempering the cut surface CS of the processing target PP may be reduced.

In an embodiment, the processing target PP may be a glass, and the second material M2 may be sodium hydroxide. In this case, potassium ions of the glass and sodium ions of sodium hydroxide may be ion-exchanged such that the processing target PP is tempered at the ion exchange temperature or more. In an embodiment, the ion exchange temperature between the glass and the sodium hydroxide may be in the range from about 370° C. or more to about 470° C. or less, for example.

However, the ion exchange temperature may be varied depending on the type of a material included in the second material M2, instead of being fixed to a predetermined value. In other words, the ion exchange temperature corresponds to a value varied depending on the element of the processing target PP or the element of the second material M2.

The temperature of the first region 1A, to which the beam BM is irradiated, of the processing target PP may be about 900° C. or more. This temperature may be an ion exchange temperature or more between the second material M2 and the processing target PP. The temperature of the processing target PP may be increased to the ion exchange temperature or more through the beam BM. Accordingly, the ion exchange between the second material M2 and the processing target PP may be accelerated. In an embodiment, the beam BM may be emitted from a UV laser or carbon dioxide ($CO_2$) laser, for example.

In addition, when the processing target PP is the glass, the temperature of the first region 1A is maintained to about 900° C. or more through the beam BM, such that the glass may be more easily cut. The cuttable temperature of the glass is about 500° C., and the glass may be easily cut using the first material M1 together with the beam BM.

Figure 7:
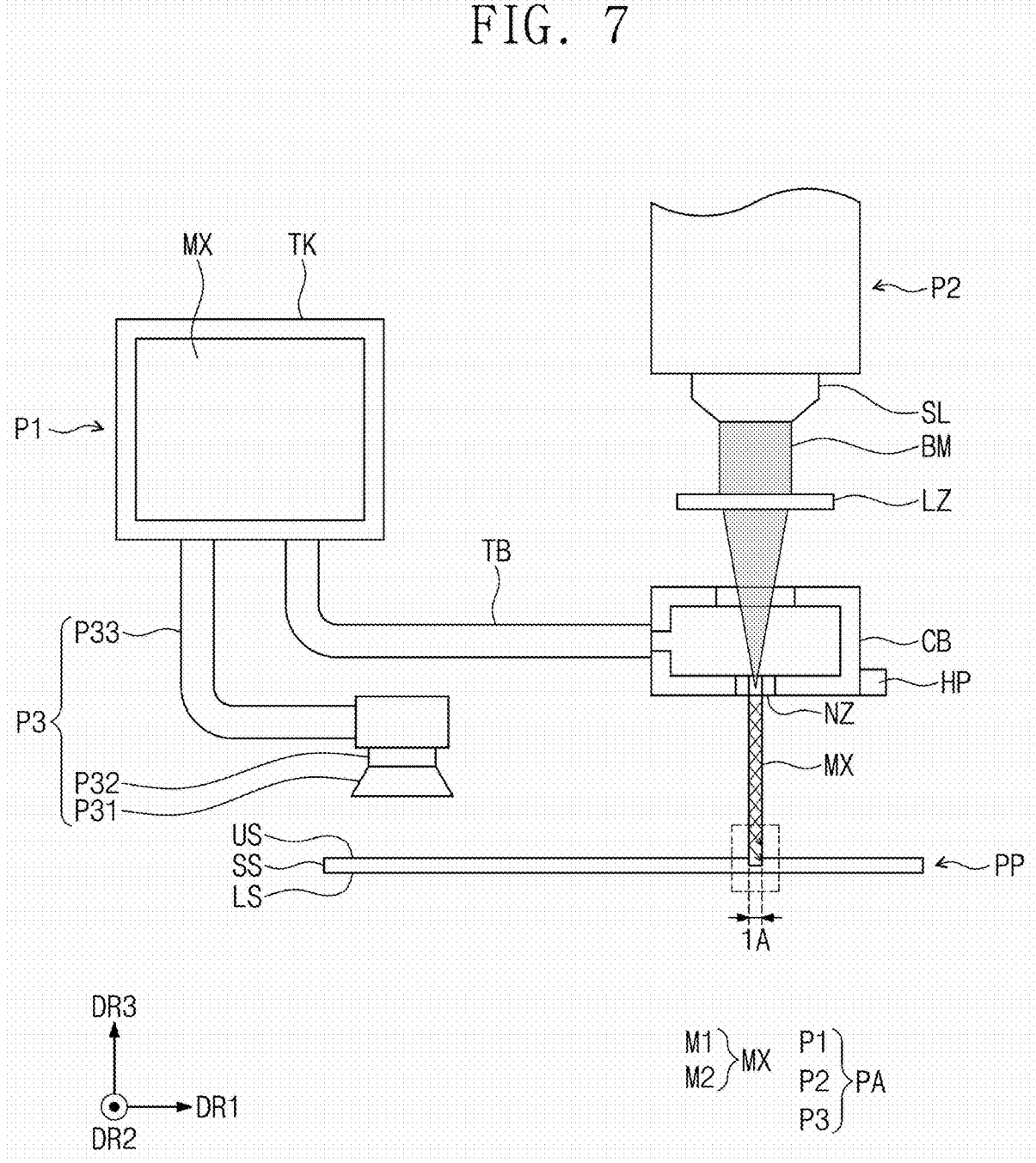
FIG. 7 is a cross-sectional view of an embodiment of a processing apparatus according to the disclosure.

FIG. 7 is a cross-sectional view of an embodiment of the processing apparatus PA according to the disclosure.

In an embodiment of the disclosure, the processing apparatus PA may include an additional processing unit P3. The additional processing unit P3 may heal or temper the cut surface CS, which is similar to the first processing unit P1. The cut surface CS may be entirely healed or tempered by the additional processing unit P3 together with the first processing unit P1. The healing or the tempering performed by the additional processing unit P3 may be identical to the heating or the tempering performed by the first processing unit P1 described above.

The additional processing unit P3 may spray the second material M2 to the first region 1A. In detail, the cut surface CS may be healed or tempered by applying the second material M2 to the cut surface CS of the first region 1A. The material sprayed by the additional processing unit P3 is not limited to the second material M2. In an embodiment, the first material M1 may be sprayed together. In addition, a third material may be sprayed to heal or temper the cut surface CS, in addition to the first material M1 and the second material M2, for example.

The additional processing unit P3 may include a spraying member P31 to spray the second material M2, an angle adjusting member P32 to adjust the angle of the spraying member P31, and a tube member P33 to supply the second material M2 to the spraying member P31.

The region, which is to be sprayed with the second material M2, in the processing target PP and the spraying direction of the second material M2 may be variously adjusted, through the angle adjusting member P32 to adjust the angle of the spraying member P31. Although not illustrated, the tube member P33 may be connected to the tank TK of the first processing unit P1 to transmit the mixture MX or the second material M2. However, the disclosure is not limited thereto. In an embodiment, the tube member P33 may be connected to the additional tank TK to store the second material M2 or the third material, for example.

The additional processing unit P3 is not limited to any one example, and may have various a detailed component, position, or shape. In other words, the additional processing unit P3 is not limited to the detailed component, position, or shape illustrated in the drawing, but may have various components, positions, or shapes. In an embodiment, the additional processing unit P3 may have the configuration similar to the configuration of the first processing unit P1, and the additional processing unit P3 may include both the component of the first processing unit P1 and the configuration of the second processing unit P2, for example.

The additional processing unit P3 may spray the second material M2 to a region wider than a region of the first processing unit P1. In addition, the additional processing unit P3 may spray even to a region in addition to the first region TA.

The additional processing unit P3 may spray the second material M2 in a direction different from a direction of the first processing unit P1. In an embodiment, when the first processing unit P1 sprays the mixture MX in the direction normal to the processing target PP, the additional processing unit P3 may spray the second material M2 in a direction tilted at a predetermined angle "01" (refer to FIG. TOC) with respect to the normal direction to the processing target PP, for example.

Figure 8A:
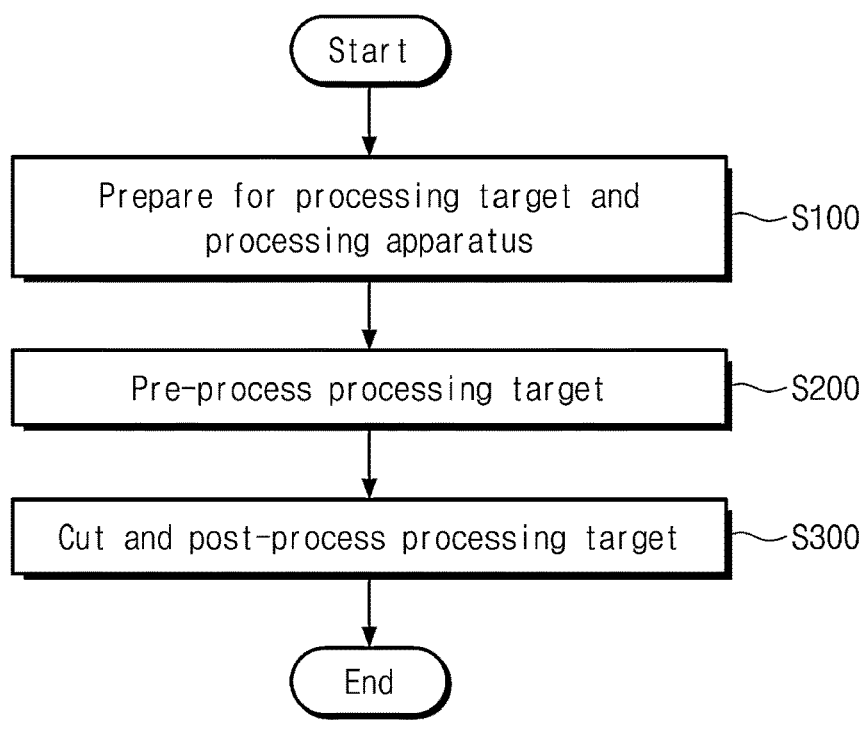
FIG. 8A is a flowchart illustrating an embodiment of a method for processing a processing target according to the disclosure.
Figure 8B:
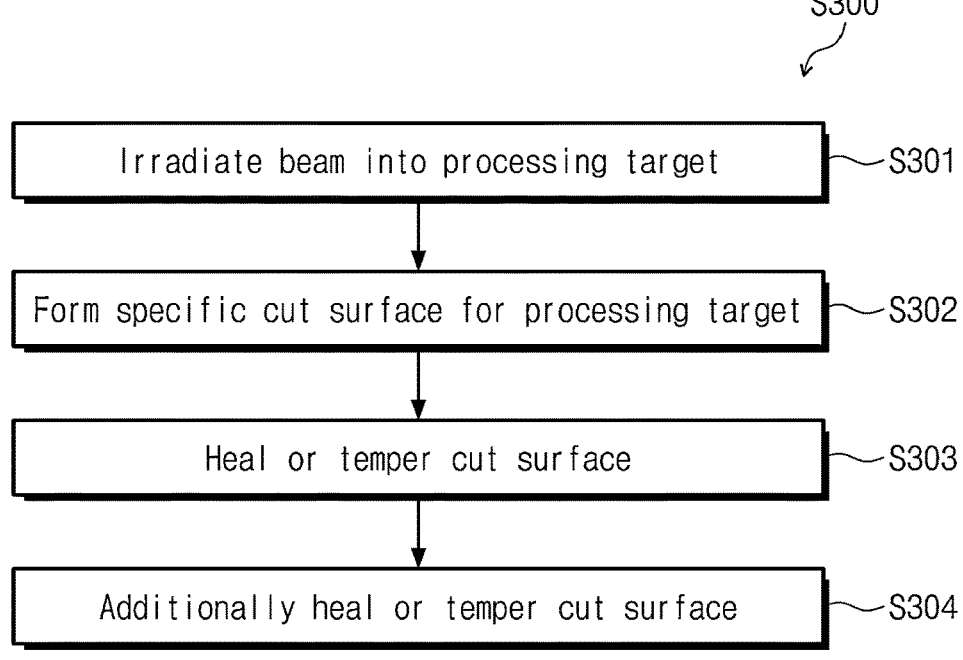
FIG. 8B is a flowchart illustrating detailed some operations of operations of FIG. 8A.

FIG. 8A is a flowchart illustrating an embodiment of a method for processing a processing target according to the disclosure, and FIG. 8B is a flowchart illustrating detailed some operations of operations of FIG. 8A.

Referring to FIG. 8A, according to the disclosure, the method for processing the processing target PP may include preparing for the processing target PP and the processing apparatus PA (S100), pre-processing the processing target PP (S200), and cutting and post-processing the processing target PP (S300).

The prepared processing target PP may be a glass. The glass may be an UTG having the thickness in the range from about 10 μm or more to about 100 μm or less. In an embodiment, the glass GL may have the thickness of about 30 μm, for example.

The prepared processing apparatus PA may be the processing apparatus PA described above. In other words, the prepared processing apparatus PA may include the first processing unit P1, the second processing unit P2, the additional processing unit P3, and the heating unit HP. The additional processing unit P3 or the heating unit HP may be omitted from the processing apparatus PA, but the disclosure is not limited to any particular embodiment.

For the explanation of convenience, the processing target prepared before the pre-processing is defined as a preliminary processing target, and the processing target after the pre-processing is defined as the processing target PP.

According to the processing method according to the disclosure, the processing apparatus PA may move to process the processing target PP. However, the disclosure is not limited to the movement only of the processing target PP. In other words, the processing target PP may be moved through a manner for moving a support member after disposing the processing target PP on the support member such as jig The pre-processing of the processing target PP (S200) is to pre-process a preliminary processing target. In detail, the pre-processing of the processing target PP (S200) is to temper the preliminary processing target.

As described above, the preliminary processing target may be tempered through ion-exchange between the element of the preliminary processing target and a tempering material. In an embodiment, when the preliminary processing target is a glass and the tempering material is sodium hydroxide, potassium ions of the glass substrate and sodium ions of sodium hydroxide may be ion-exchanged therebetween at the ion exchange temperature or more to temper the preliminary processing target, for example.

In an embodiment, according to one tempering manner, the preliminary processing target is immersed into the tempering liquid having the temperature in the range from about 370° C. or more to about 470° C. or less, such that the ion-exchange occurs between the tempering liquid and the preliminary processing target, for example. The preliminary processing target may be tempered through the ion exchange between the tempering liquid and the preliminary processing target.

In an embodiment of the disclosure, in the processing method, the preliminary processing target may be first tempered before cutting the processing target PP. Accordingly, each processing target PP cut needs not to be individually subject to the tempering operation, thereby simplifying the process to increase the productivity.

The processing target PP to be described below refers to a processing target PP primarily completely tempered in the pre-processing operation. However, the subsequent operation may be similarly applied to the preliminary processing target, as well as the tempered processing target PP.

Referring to FIG. 8B, according to the disclosure, the cutting and post-processing of the processing target PP (S300) may include irradiating the beam BM to the first region 1A of the processing target PP (S301), forming a predetermined cut surface CS in the first region 1A by applying the first material M1 to the first region 1A (S302), and healing or tempering the cut surface CS by applying the second material M2 different from the first material M1 to the first region 1A (S303).

In this case, the first material M1 and the second material M2 may simultaneously applied. In addition, the disclosure is not limited thereto, and even the beam BM may be applied together with the first material M1 and the second material M2.

Figure 9:
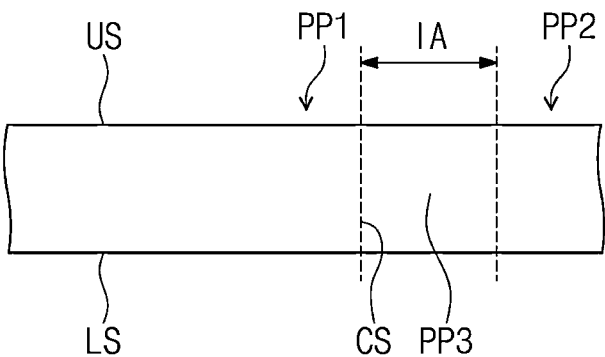
FIG. 9 is a partial enlarged view of an embodiment of a processing target according to the disclosure.

FIG. 9 is a partial enlarged view of an embodiment of the processing target PP according to the disclosure.

Referring to FIG. 9, the processing target PP may be a glass substrate. The processing target PP may include an upper surface and a lower surface. The upper surface and the lower surface of the processing target PP are opposite to each other in a third direction, and the normal direction to each of the upper surface and the lower surface may be parallel to the third direction.

As the beam BM and the mixture MX are applied to the first region 1A of the processing target PP to cut the processing target PP, the processing target PP is removed by the first region 1A.

In other words, the processing target PP before cutting includes a first processing target PP1 and a second processing target PP2 that are not removed a the third processing target PP3 removed. The third processing target PP3 corresponds to the first region 1A of the processing target PP before cutting.

Referring to the drawings, the third processing target PP3 is interposed between the first processing target PP1 and the second processing target PP2.

The cut surface CS may be defined between the third processing target PP3 and the first processing target PP1. The cut surface CS may be defined between the third processing target PP3 and the second processing target PP2 without being limited to the drawings.

In this case, the first processing target PP1 and the second processing target PP2 may be substantially the same as each other, and may have the same physical property and the same standard. Hereinafter, the following description will be made while focusing on the first processing target PP1. The description may be identically applied to the second processing target PP2 without limitation to the first processing target PP1.

The second material M2 may be sprayed onto the cut surface CS of the first processing target PP1 by the processing apparatus PA or the additional processing apparatus PA, thereby healing or tempering the cut surface CS.

The processing method in an embodiment of the disclosure may include a cleaning operation. In the cleaning operation, the surface of the processing target PP may be cleaned.

The cleaning operation may be performed before preprocessing the processing target PP, before cutting the processing target PP, before post-processing the processing target PP, or after post-processing the processing target PP. In other words, the cleaning operation may be performed in various operations, without the limitation to any one moment between predetermined operations. In addition, the cleaning operation may be performed several times.

In this case, a cleaning manner in the cleaning operation may be a physical manner or a chemical manner, and may not be limited to any one manner of the physical manner or the chemical manner.

Figure 10A:
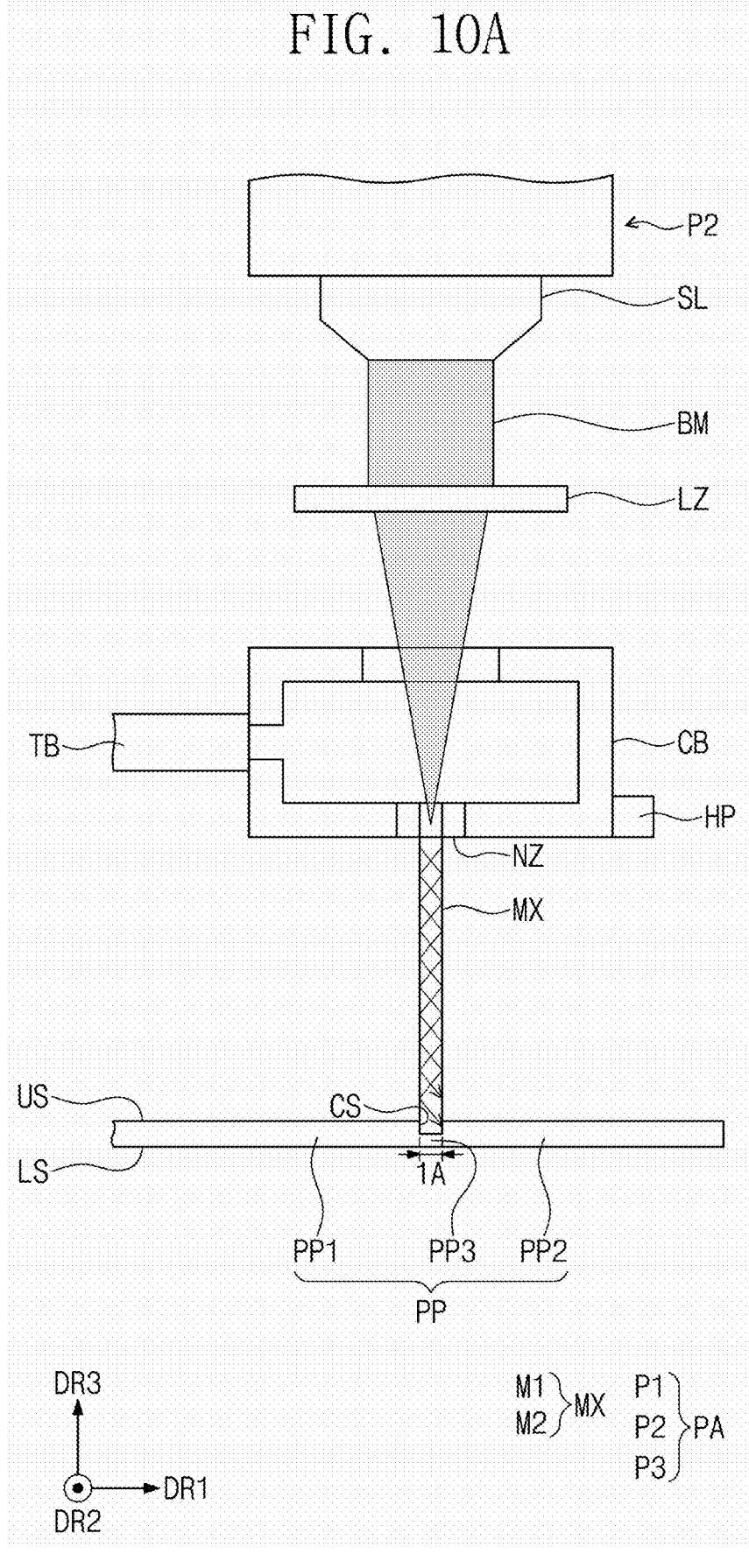
FIGS. 10A to 10C are views illustrating an embodiment of an operating state in one operation of a processing method according to the disclosure.
Figure 10B:
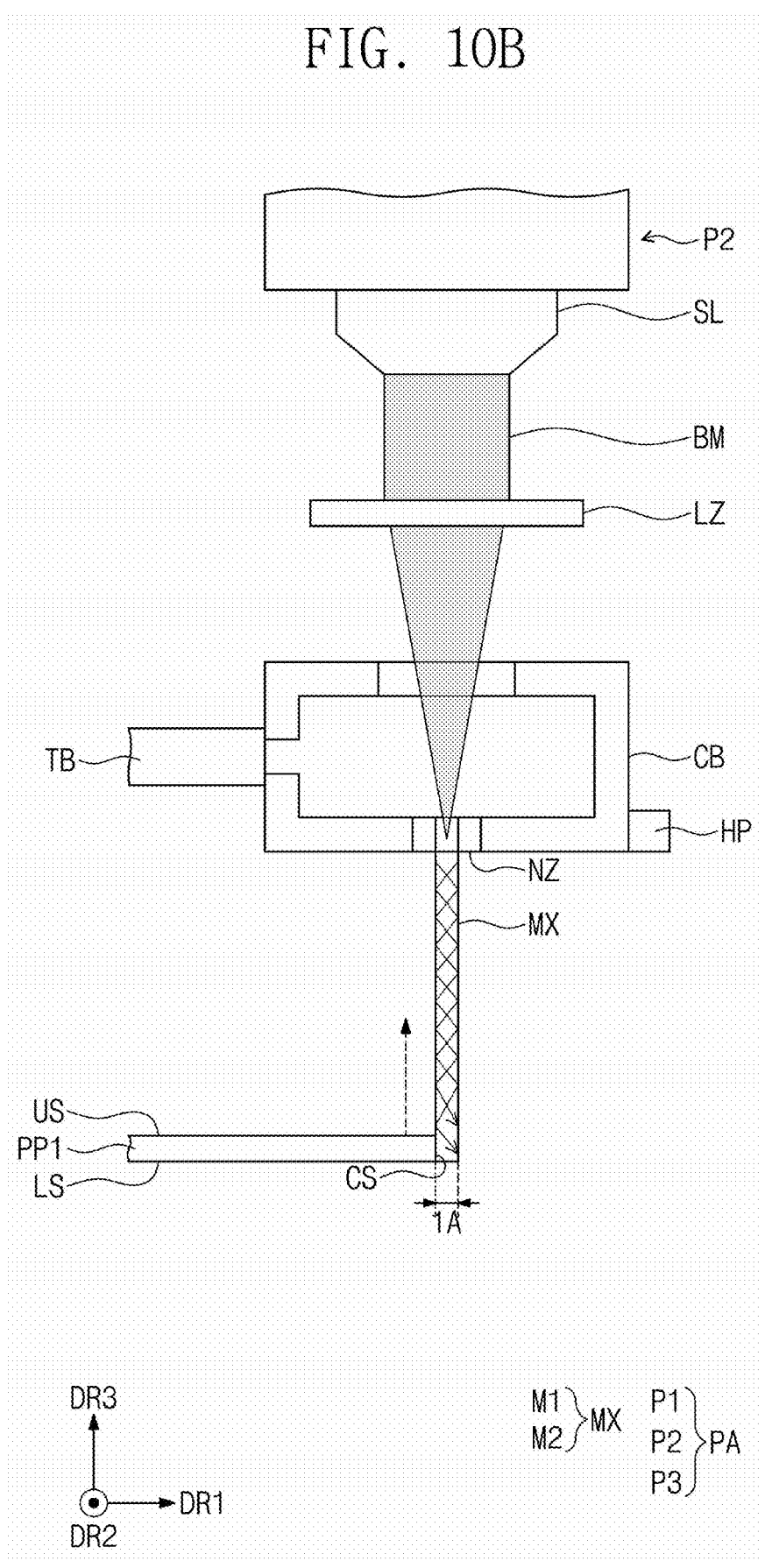
Figure 10C:
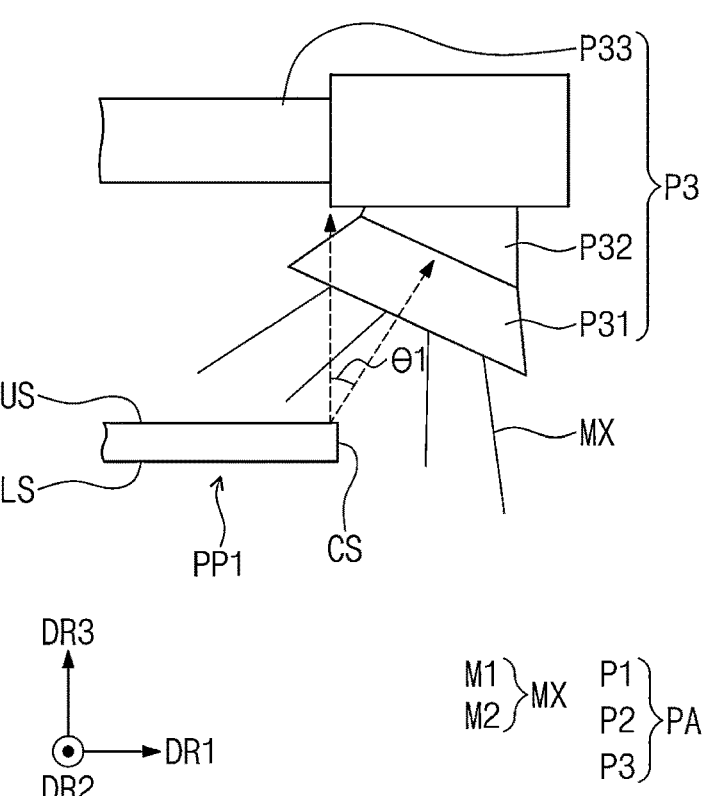

FIG. 10A is a view illustrating an embodiment of an operating state in one operation of a processing method according to the disclosure. FIG. 10B is a view illustrating an embodiment of an operating operation in one operation of the processing method according to the disclosure. FIG. 10C is a view illustrating an embodiment of an operating state in one operation of the processing method according to the disclosure.

Referring to FIG. 10A, the beam BM may be irradiated to the first region 1A from the second processing unit P2 of the processing apparatus PA, and the mixture MX may be sprayed to the first region 1A from the first processing unit P1 (refer to FIG. 7). In an embodiment, the path of the beam BM may be disposed inside the mixture MX sprayed. The beam BM may be totally reflected in the sprayed mixture MX, for example. In this case, the cut surface CS may be exposed in the first region 1A.

The heating unit HP may maintain the temperature of the mixture MX to be in a predetermined temperature range.

Referring to FIG. 10B, the mixture MX may be continuously sprayed into the first region 1A at a higher pressure in a direction perpendicular to the normal direction to the processing target PP, and the beam BM may be continuously irradiated to the first region 1A inside the mixture MX.

In this case, when the beam BM is irradiated to the first region 1A and the mixture MX is continuously sprayed, the cut surface CS may be further exposed in the first region 1A. In this case, the first processing target PP1 may be separated from the second processing target PP2, and the third processing target PP3 may be cut out and removed.

Referring to FIG. 10C, the second material M2 may be sprayed to the cut surface CS of the first processing target PP1 by the additional processing apparatus PA, thereby healing or tempering the cut surface CS. The cut surface CS may be entirely healed or tempered without omission.

The additional processing apparatus PA may be the processing apparatus PA only including the additional processing unit P3. The disclosure is not limited thereto, but the additional processing apparatus PA may be a processing apparatus PA including the first processing unit P1 or the second processing unit P2.

The additional processing apparatus PA may spray the second material M2 in a direction different from a direction of the processing apparatus PA. In an embodiment, when the processing apparatus PA sprays the mixture MX in the direction normal to the processing target PP, the additional processing unit P3 may spray the second material M2 in a direction tilted at a predetermined angle with respect to the normal direction to the processing target PP, for example.

Figure 11:
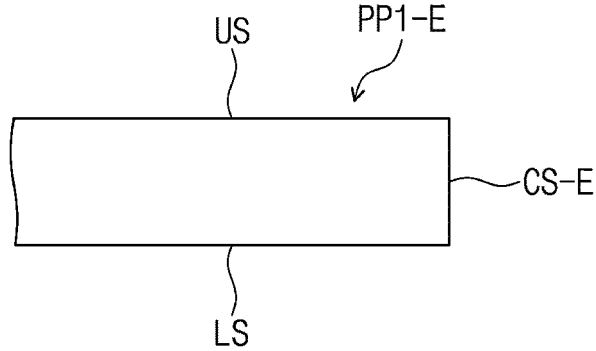
FIG. 11 is an enlarged view illustrating an embodiment of the state that a processing target is completely processed according to the disclosure.

FIG. 11 is an enlarged view illustrating an embodiment of the state that the processing target PP is completely processed according to the disclosure.

Referring to FIG. 11, it may be recognized that a first processing target PP1-E is completely healed or tempered through the post-processing process. The first processing target PP1-E having a cut surface CS-E completely healed or tempered is completely healed and tempered in the upper surface US, the lower surface LS, and the cut surface CS-E.

The upper surface US, the lower surface LS, the cut surface CS-E of the first processing target PP1 may be all healed or tempered. Accordingly, it is possible to prevent the imbalance of force due to a crack or a tip in a predetermined portion of a predetermined surface, e.g., the cut surface CS-E. Accordingly, the first processing target PP1 may be prevented from being damaged due to the imbalance of the force. Accordingly, a product, such as a window, may be prevented from being broken, when the product is used.

According to the disclosure, the tempered processing target is simultaneously cut and tempered, such that a processing target having a desired physical property is easily processed to be in a desired size. Accordingly, the processing of the processing target PP may be simplified such that the productivity is increased. Accordingly, the yield rate may be prevented from being lowered. As the productivity is increased and the yield rate is increased, the production costs may be prevented from being increased.

In addition, the tempered processing target is simultaneously cut and tempered, instead that the cut surface is additionally tempered after the tempered processing target is cut. Accordingly, the cut surface of the processing target is more easily tempered.

Further, according to the disclosure, after a glass is tempered in the unit of a bare glass, the glass is cut and a cut surface of the glass is tempered. Accordingly, the time desired to temper an individual glass in a cell unit may be reduced in each process, thereby increasing the productivity and preventing the yield rate from being lowered.

In addition, the process may be identically applied even to when the processing target is the UTG, as well as the general glass.

According to the processing apparatus and the processing method of an embodiment of the disclosure, the ultra-thin glass may be cut through the beam and the material.

According to the processing apparatus and the processing method of an embodiment of the disclosure, the temperature of a predetermined region of an ultra-thin glass may be maintained to the temperature of the ion-exchange between a partial material of a mixture and a processing target According to the processing apparatus and the processing method of an embodiment of the disclosure, the ultra-thin glass may be simultaneously cut and tempered by spraying a mixture into a predetermined region of the ultra-thin glass.

Although an embodiment of the disclosure has been described for illustrative purposes, those skilled in the art will appreciate that various modifications, and substitutions are possible, without departing from the scope and spirit of the invention as disclosed in the accompanying claims. Accordingly, the technical scope of the disclosure is not limited to the detailed description of this specification, but should be defined by the claims.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A processing method using a processing apparatus, the processing method comprising:

pre-processing a processing target; and
cutting and post-processing the processing target,
wherein the cutting and the post-processing the processing target includes:
irradiating a beam into a first region of the processing target;
providing a first material to the first region in a manner that the first material forms a predetermined cut surface in the first region;
providing a second material different from the first material to the first region; and
healing and tempering the predetermined cut surface by the second material,
wherein the providing the first material and the providing the second material are simultaneously performed,
wherein the cutting and the post-processing the processing target further includes:
healing and tempering the predetermined cut surface through an additional processing apparatus, and wherein the additional processing apparatus sprays the second material in a direction tilted relative to a direction normal to the processing target at a predetermined angle.

2. The processing method of claim 1, wherein the beam maintains a temperature of the first region to a predetermined temperature or more, and
wherein the predetermined temperature is set to enable ion-exchange between the processing target and the second material.

3. The processing method of claim 1, wherein the processing apparatus sprays the first material and the second material in a direction normal to the processing target.

4. The processing method of claim 1, wherein the additional processing apparatus sprays the second material to a second region of the processing target, and
wherein the second region is wider than the first region.

5. The processing method of claim 1, wherein the first material includes an acid including F, S, or N, and
wherein the second material includes at least one of potassium hydroxide, sodium hydroxide, or gallium nitrate.

6. The processing method of claim 1, wherein the processing apparatus includes:
a first processing unit which sprays a mixture including the first material and the second material into the first region, and
a second processing unit which irradiates the beam into the first region,
wherein the beam has a path defined inside the sprayed mixture, and
wherein the beam is totally reflected inside the sprayed mixture.

7. The processing method of claim 1, wherein the beam is generated by an ultraviolet laser or generated by a carbon dioxide ($CO_2$) laser.

8. The processing method of claim 1, further comprising: cleaning the processing target.

9. The processing method of claim 1, wherein the processing target is a glass having a thickness in a range of about 10 micrometers to about 100 micrometers.

* * * * *